United States Patent
Miyashita

(10) Patent No.: US 7,270,009 B2
(45) Date of Patent: Sep. 18, 2007

(54) DIAPHRAGM TYPE PRESSURE SENSOR

(75) Inventor: Haruzo Miyashita, Fujiyoshida (JP)

(73) Assignee: Canon Anelva Technix Corporation, Fuchu-Shi, Tokyo (JP)

( * ) Notice: Subject to any disclaimer, the term of this patent is extended or adjusted under 35 U.S.C. 154(b) by 100 days.

(21) Appl. No.: 11/350,728

(22) Filed: Feb. 10, 2006

(65) Prior Publication Data

US 2006/0174710 A1 Aug. 10, 2006

(30) Foreign Application Priority Data

Feb. 10, 2005 (JP) ............................... 2005-033735

(51) Int. Cl.
*G01L 7/08* (2006.01)

(52) U.S. Cl. ........................ 73/715; 73/716; 73/718; 73/724

(58) Field of Classification Search ................. 73/715, 73/716, 718, 724
See application file for complete search history.

(56) References Cited

U.S. PATENT DOCUMENTS

| | | | |
|---|---|---|---|
| 6,252,759 B1 * | 6/2001 | Lange et al. ............. | 361/283.1 |
| 6,374,680 B1 * | 4/2002 | Drewes et al. ................ | 73/718 |
| 6,521,966 B1 * | 2/2003 | Ishio et al. ................. | 257/417 |
| 6,568,274 B1 * | 5/2003 | Lucas et al. ................... | 73/718 |
| 6,598,483 B2 | 7/2003 | Miyashita et al. | |
| 6,912,910 B2 | 7/2005 | Miyashita | |
| 6,935,181 B2 * | 8/2005 | Miyashita et al. ............ | 73/718 |
| 6,948,374 B2 | 9/2005 | Miyashita | |
| 2004/0129947 A1 * | 7/2004 | Miyashita ..................... | 257/99 |
| 2004/0182165 A1 * | 9/2004 | Miyashita .................... | 73/718 |
| 2004/0206185 A1 * | 10/2004 | Miyashita et al. ............ | 73/718 |

FOREIGN PATENT DOCUMENTS

| | | |
|---|---|---|
| JP | 1994-66658 | 3/1994 |
| JP | 08-035899 | 2/1996 |
| JP | 2000-019044 | 1/2000 |
| JP | 2001-201417 | 7/2001 |
| JP | 2001-255225 | 9/2001 |
| JP | 2002-055008 | 2/2002 |

* cited by examiner

*Primary Examiner*—Edward Lefkowitz
*Assistant Examiner*—Freddie Kirkland, III
(74) *Attorney, Agent, or Firm*—Buchanan Ingersoll & Rooney PC

(57) ABSTRACT

A diaphragm pressure sensor includes a first insulating substrate, a conductive substrate with a diaphragm, and a second insulating substrate with a gas inlet are bonded so as to form a pressure reference room between the diaphragm and the first insulating substrate and a pressure measuring room between the diaphragm and the second insulating substrate. The deformation of the diaphragm caused by the pressure difference between the pressure measuring room and the pressure reference room is measured to obtain the pressure of a space which is communicated with the pressure measuring room through the gas inlet. Furthermore, a plate is adhered to a surface of at least one of the first and second insulating substrates and the plate has a lower thermal expansion rate in an ambient temperature than that of the insulating substrate to which the plate is adhered.

16 Claims, 9 Drawing Sheets

*Fig.* 4B
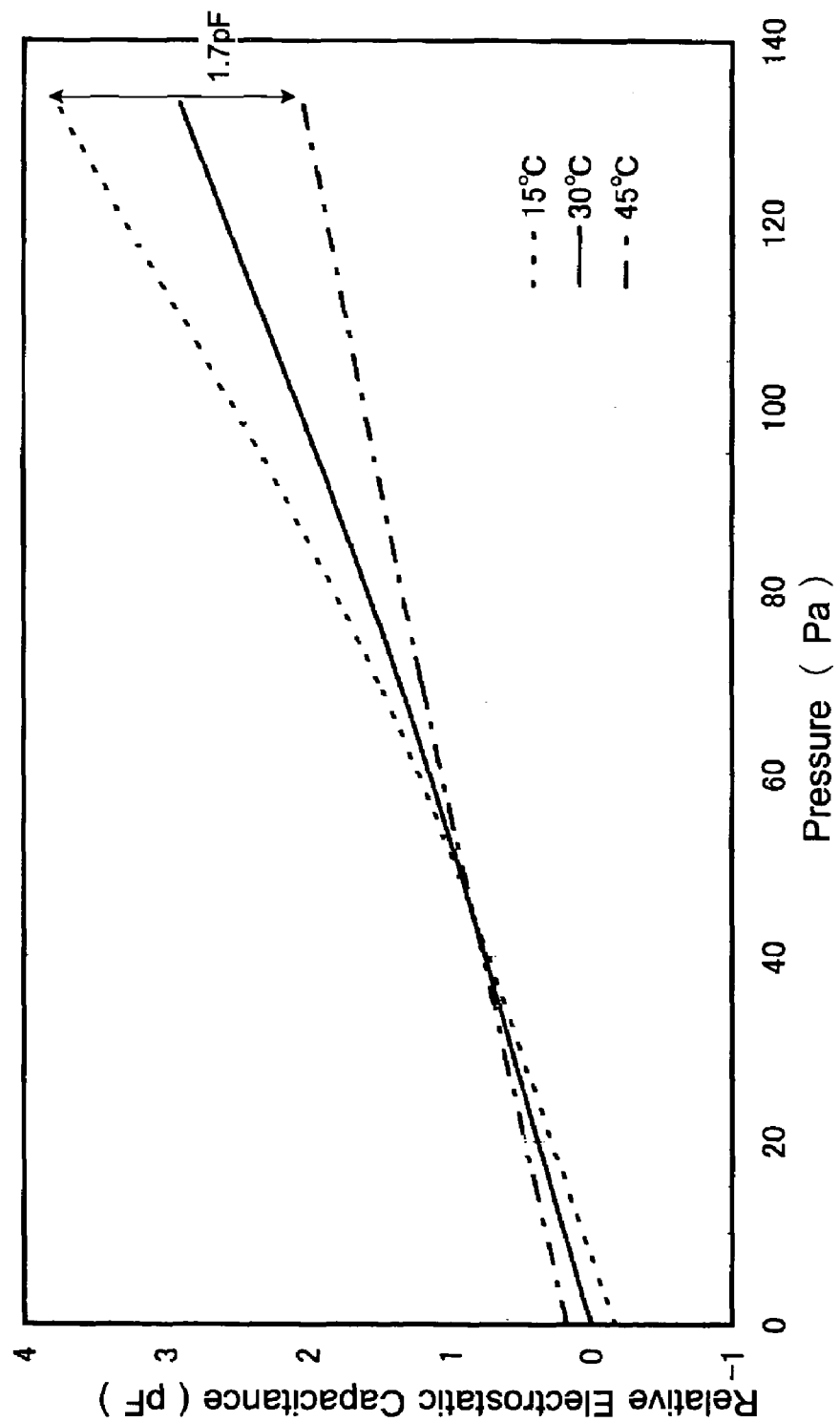

DIAPHRAGM TYPE PRESSURE SENSOR

CROSS-REFERENCE TO RELATED APPLICATIONS

The present application claims the priority of JP 2005-033735 filed in Japan on Feb. 10, 2005, the entire contents of which are incorporated herein by reference.

BACKGROUND OF INVENTION

1. Field of the Invention

The present invention relates to a diaphragm type pressure sensor and, more particularly, to the diaphragm type pressure sensor which is hardly influenced by the change of ambient temperature and makes possible precise pressure measurements with a high accuracy and sensitivity.

2. Description of Related Art

A conventional capacitive pressure sensor is explained below as an example of diaphragm type pressure sensor.

As shown in a schematic diagram of FIG. 6, a capacitive pressure sensor has a configuration in which a first glass substrate 10 on which a capacitance electrode 11 is formed, a silicon substrate 20 in which a diaphragm 21 is formed, and a second glass substrate 30 through which a gas inlet 31 is formed, are bonded to form a pressure reference room 1 and a pressure measuring room 2 on both sides of the diaphragm 21. A non-evaporable getter 3 is placed inside the pressure reference room 1 to maintain the room at a high vacuum.

The pressure sensor is mounted on, for example, an adapter 4 with an O-ring 5, and is fixed by using a press plate 6. The adapter 4 is installed in a gauge port of a vacuum chamber. The vacuum chamber is communicated with the pressure measuring room 2 through the gas inlet 31. The pressure in the vacuum chamber is applied on the pressure measuring room to deform the diaphragm. The amount of deformation depends on the pressure difference between the pressure measuring room 2 and the pressure reference room 1, and therefore can be obtained by measuring electrostatic capacitance between the diaphragm 21 and the capacitance electrode 11 with the aid of terminal pins 12 and 13.

A micromachining technique is used for manufacturing such pressure sensors.

An anodic bonding method is usually used to bond the first and second glass substrates to the silicon substrate. Here, the silicon substrate and the glass substrate are heated to 300-450° C. and a voltage of several hundreds volts to 1000 volts is applied between the substrates to firmly bond the substrates.

However, when the substrates are cooled to a room temperature after bonded at such a high temperature, the distortion appears in the diaphragm due to the difference in thermal expansion rate characteristics between the silicon substrate and the glass substrate. As a result, the stability of the pressure measurements is decreased and measured values fluctuate largely when the ambient temperature around the sensor is changed. For these reasons, glasses such as a Pyrex glass (Corning Inc.), having a thermal expansion rate characteristic close to that of silicon, have been generally employed to make the diaphragm distortion minimum. The conventional sensors are described in, for example, JP2001-255225A and JP1994-66658A.

OBJECTS AND SUMMARY

As semiconductor devices and electronic components have greatly progressed in the density and function in recent years, the manufacturing processes are required to be controlled more precisely. Thus, a pressure sensor is also required to cope with a variety of process conditions.

In this situation, the conventional capacitive pressure sensor as shown in FIG. 6 is not precise and sensitive enough to cope with such requirements and the measurement error caused by the fluctuation of ambient temperature becomes a serious problem. Particularly in the case of highly sensitive sensors, in which the diaphragm is made thinner and/or larger in order to increase the sensibility, the fluctuation of ambient temperature further influences and decreases the measurement accuracy.

Therefore, a variety of attempts have been made to solve the problems. For example, a reference electrode was arranged for temperature compensation, and, in addition, a circuit was arranged to carry out temperature correction based on the temperature-correction data obtained in advance. However, these configurations were not enough to carry out high precision measurements. This indicates that the basic temperature characteristics of the diaphragm should be improved.

Then, in order to develop the sensor configuration with an excellent temperature characteristic, the present inventor fabricated a variety of pressure sensors using glass substrates with different thickness and material, under various conditions. Low expansion glasses such as a SW-Y glass of Asahi Techno Glass Corporation, which has a close thermal expansion rate characteristic to that of silicon as compared with a Pyrex glass, were employed to reduce the stress due to the difference of thermal expansion rates. However, the accuracy of pressure measurement or its dependency on the ambient temperature was not improved contrary to the expectations. That is, it was found that pressure sensors having a high temperature characteristic could not be fabricated only by using a glass substrate, which has a close thermal expansion rate characteristic to that of silicon at the bonding temperature.

In contrast, the present inventor adhered a glass plate of different material to the first glass substrate while investigating the influence of the thickness of first glass substrate on the temperature characteristic of the sensor, and found that the variation amount of the measured values to temperature fluctuation has a certain relation with the material of the glass plates adhered to the first glass plate. The present inventor further made investigation based on the knowledge mentioned above, and found a new sensor configuration which has an excellent temperature characteristic and can carry out pressure measurements with a high accuracy. Thus, the present invention has been accomplished. So far the temperature characteristics have been discussed for the capacitive pressure sensor. The problems and the conditions mentioned above also occur in other diaphragm type pressure sensors.

Thus, an object of this invention is to provide a diaphragm type pressure sensor, which is little influenced by ambient temperature fluctuation and enables pressure measurements with a higher accuracy.

A diaphragm type pressure sensor according to an embodiment of this invention, includes a first insulating substrate, a conductive substrate with a diaphragm, and a second insulating substrate with a gas inlet that are bonded so as to form a pressure reference room between said diaphragm and said first insulating substrate and a pressure measuring room between said diaphragm and said second insulating substrate. A plate is adhered to at least one of said first and second insulating substrates, and said plate has a lower thermal expansion rate in an ambient temperature than that of said insulating substrate to which said plate is adhered. The deformation of said diaphragm caused by the pressure difference between said pressure measuring room and said pressure reference room is measured to obtain the pressure of a space which is communicated with said pressure measuring room through said gas inlet, wherein.

A silicon wafer is preferably employed as the conductive substrate and a glass substrate is generally employed as the first and second substrates. Here, the glass substrate whose thermal expansion rate is close to silicon is preferably employed.

In this specification, the thermal expansion rate means a ratio ($\Delta L/L_0$) of the amount of thermal expansion $\Delta L$ (=L−$L_0$) at a predetermined temperature to the reference value $L_0$ at 0° C. The ambient temperature means a temperature of the environment in which the sensor is mounted, and therefore, is usually 20-50° C. in the case of usual semiconductor manufacturing apparatuses. However this invention is not restricted to such a temperature range.

As mentioned, by adhering the plate with a low thermal expansion rate on the first and/or second insulating substrate, the distortion of the diaphragm due to the temperature fluctuation is suppressed to make possible high precision pressure measurements. In addition, the thermal expansion rate of the plate can have a negative value, but its absolute value is preferably made less than that of the first or second insulating substrate.

In this invention, the thermal expansion rate of the plate at the ambient temperature is preferably a fifth (⅕) or less of that of the first or the second insulating substrate. A tenth (⅒) is more desirable. In addition, the thermal expansion rates of the first and the second insulating substrates, and the conductive substrate are preferably set to 20-100 ppm at the ambient temperature, and the expansion rate of the plate is preferably set to 4 ppm or less. By selecting the substrate material as mentioned above, the influence of ambient temperature on the diaphragm distortion is further suppressed to enable precise pressure measurements even in the system where the ambient temperature is frequently fluctuated.

The present invention can be applied to all the diaphragm type pressure sensors manufactured by using the micromachining technique, such as a capacitive pressure sensor in which the deformation of the diaphragm is obtained from the electrostatic capacitance between the diaphragm and the capacitance electrode formed on the first insulating substrate, a semiconductor sensor in which the deformation is obtained from the resistance of piezoresistance element, an oscillation type pressure sensor which utilizes the resonant frequency of diaphragm, and the like.

As has been mentioned, the diaphragm type pressure sensors, which can measure pressure with a high accuracy, can be realized by adopting the sensor in which the low expansion plate is adhered to suppress the influence of ambient temperature. Furthermore, an embodiment of the present invention can be obtained merely by adhering the low expansion plate on a conventional sensor, which provides a highly producible manufacturing method of high precision pressure sensors.

In addition, the incorporation of a conventional reference electrode structure and/or the temperature correction circuit further improves the temperature characteristic of the sensor. Accordingly, the present invention can secure highly precise measurements even for the high sensitivity pressure sensor, which is very vulnerable to the temperature fluctuation, and can provide a high precision and sensitivity diaphragm type pressure sensor that can cope with highly controlled process conditions.

BRIEF DESCRIPTION OF THE DRAWINGS

FIG. 4B is a graph showing the relationship of electrostatic capacitance vs. pressure at various temperatures for Sample 2 of 133 Pa sensor.

Figure 1:
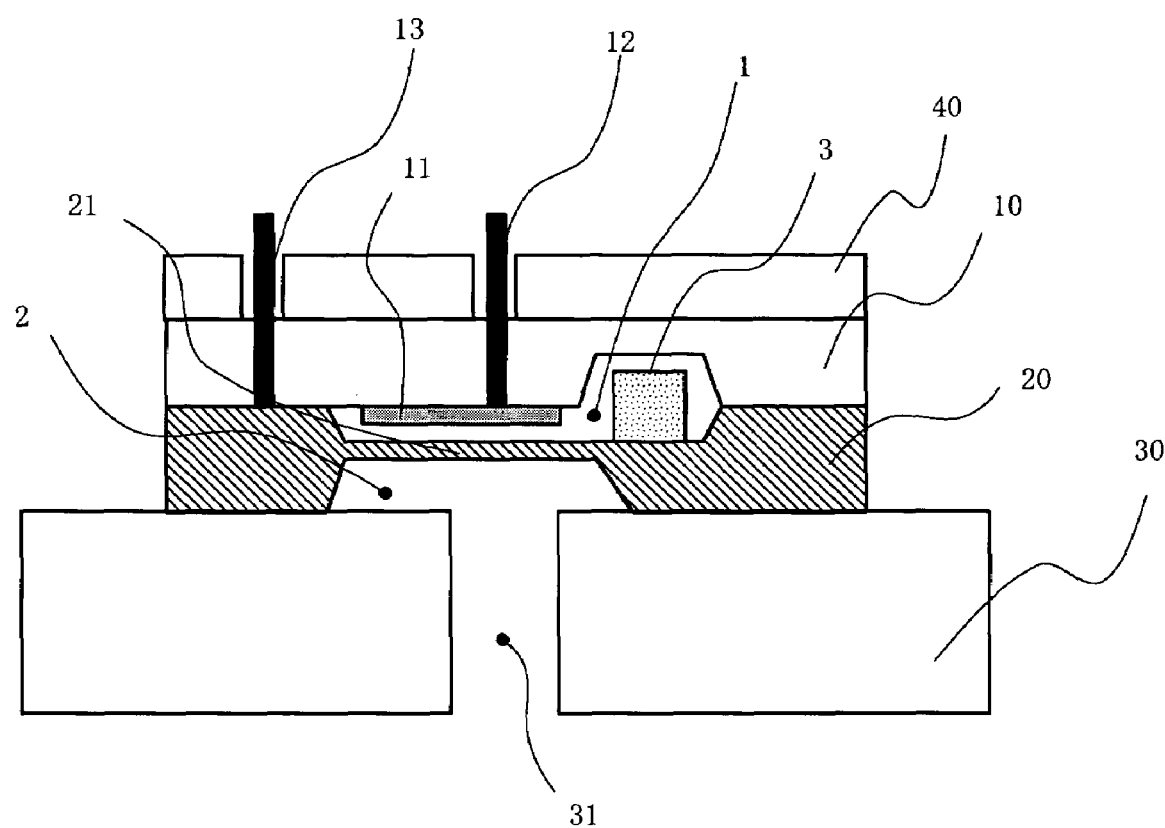
FIG. 1 is a schematic sectional view showing an embodiment of the diaphragm type pressure sensor of this invention.

Here, reference numeral 1 denotes a pressure reference room; 2 is a pressure measuring room, 3 is a non-evaporable getter; 4 is an adapter; 5 is an O-ring; 6 is a press plate; 10 is a first glass substrate; 11 is a capacitance electrode; 12 and 13 are a terminal pin; 20 is a silicon substrate; 21 is a diaphragm; 30 is a second glass substrate; 31 is a gas inlet; and 40 is a low expansion plate.

DETAILED DESCRIPTION OF THE PREFERRED EMBODIMENTS

Capacitive pressure sensors will be explained below in detail as an example of diaphragm type pressure sensors of this invention. The present invention is not restricted to the examples recited herein.

One embodiment of the capacitive pressure sensors of this invention is shown in a schematic diagram of FIG. 1. As shown in the drawing, the capacitive pressure sensor has a three layered structure, comprising a first insulating substrate 10 with a capacitance electrode 11 formed thereon, a conductive substrate 20 with a diaphragm 21, and a second insulating substrate 30 with a gas inlet 31. Here, a pressure reference room 1 and a pressure measuring room 2 are partitioned by the diaphragm 21. A non-evaporable getter 3 is placed in the pressure reference room 1, and the room is kept at a high vacuum. Furthermore, in this embodiment, a low expansion plate 40 having a thermal expansion rate lower than that of the first glass substrate is adhered on the first glass substrate.

Figure 2A:
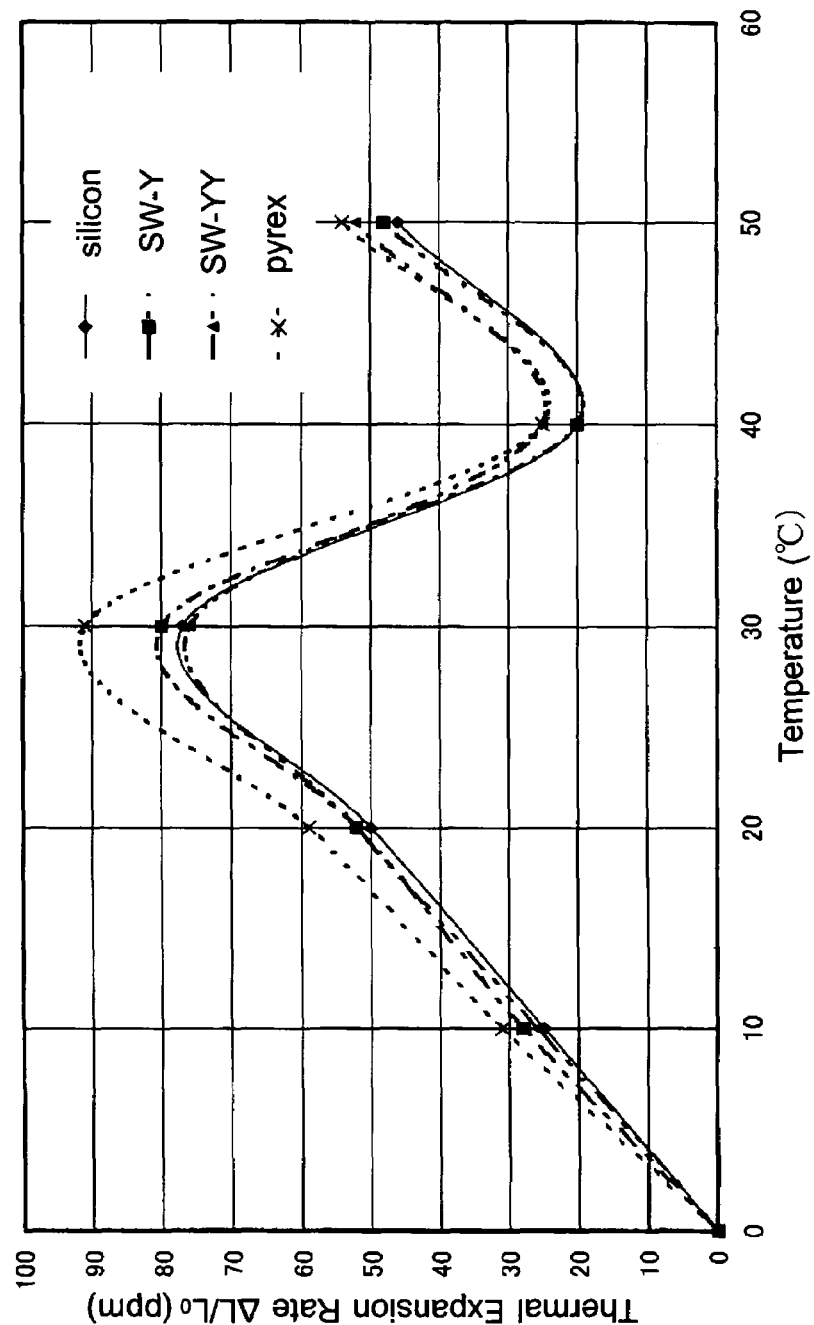
FIG. 2A is a graph showing thermal expansion rate characteristics of silicon and first and second insulating substrates in the temperature range of 0 to 50° C.
Figure 2B:
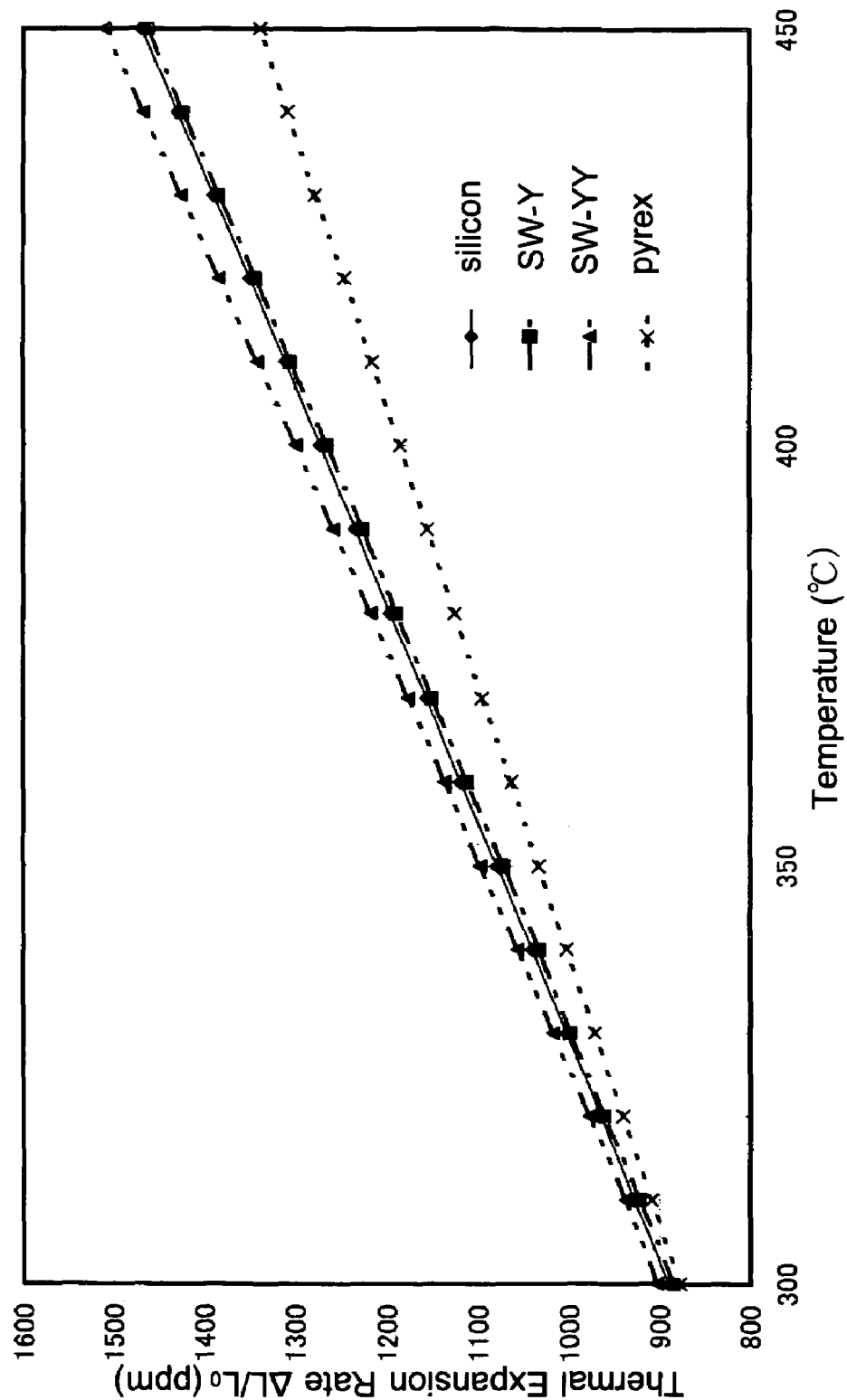
FIG. 2B is a graph showing thermal expansion rate characteristics of silicon and first and second insulating substrates in the temperature range of 300 to 450° C.

Here, the substrate materials are selected such that the conductive substrate has a thermal expansion rate close to those of the first and second insulating substrates, and the low expansion plate has a lower thermal expansion rate than that of the first insulating substrate at the ambient temperature. When a silicon wafer is employed as the conductive substrate, the glass substrates or other insulating substrates having the nearly the same thermal expansion rate as the silicon substrate are employed as the first and second insulating substrates. For example, a Pyrex glass (Corning Inc.), and a SW-Y glass and a SW-YY glass (Asahi Techno Glass Corporation) are preferably employed. The characteristics of these glasses are shown in FIG. 2. Alternatively, a SD-1 glass and a SD-2 glass (Hoya Corp.) may be also employed. Although the thermal expansion rates of SW-Y and SW-YY glasses in both bonding temperature range and ambient temperature range are close to that of silicon as compared to Pyrex glass, there was not observed apparent difference of the temperature characteristic among the pressure sensors. Thus, Pyrex glass is preferable with respect to cost. In this invention, the first insulating substrate can have a different material from the second insulating substrate.

Figure 3:
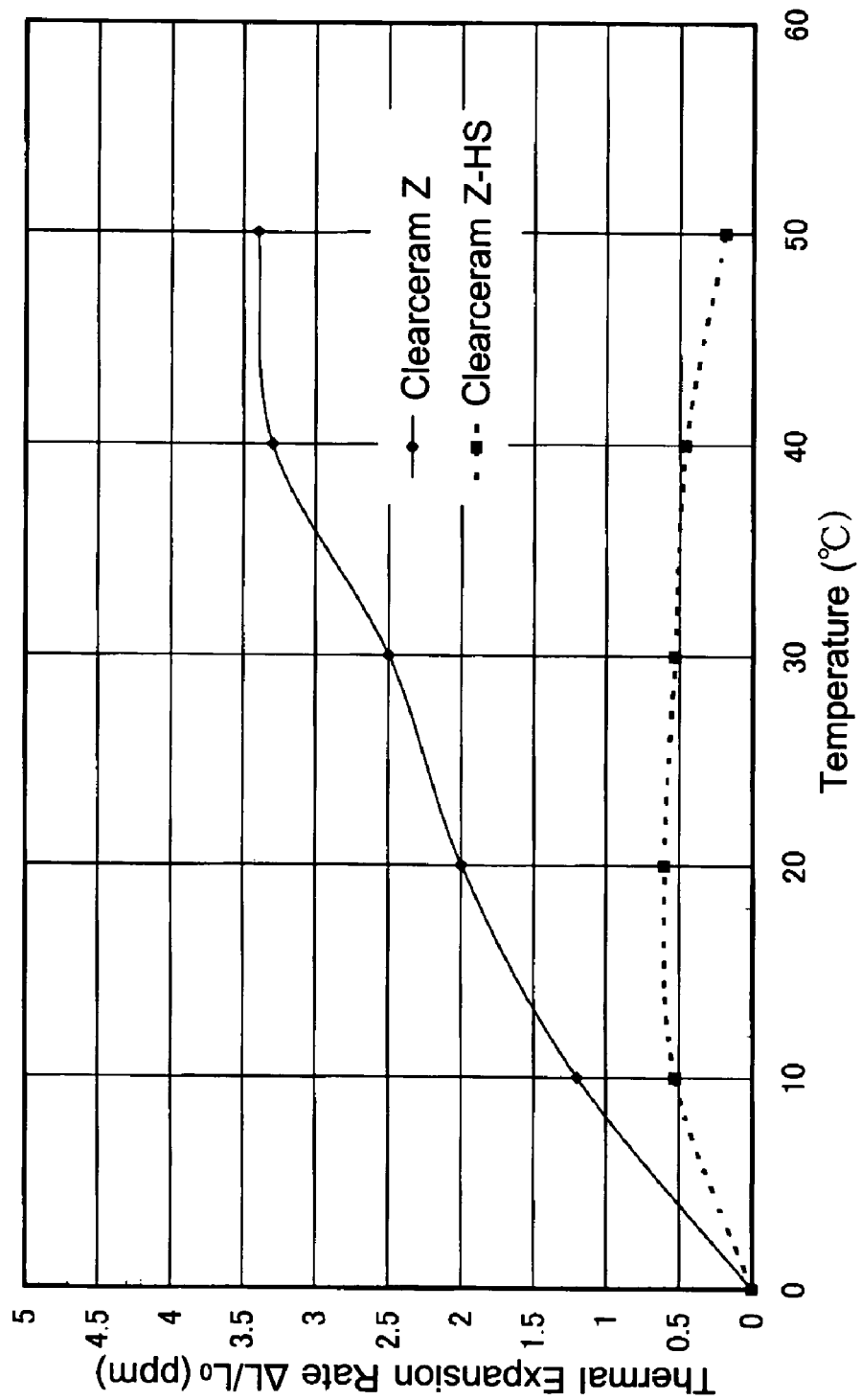
FIG. 3 is a graph showing thermal expansion rate characteristics of low expansion plates.

The thermal expansion rate of the low expansion plate at the ambient temperature of, e.g., 20-50° C. is preferably set to a fifth of the expansion rates of the first insulating substrate and silicon substrate or less. A tenth or less is more desirable. Here, the thermal expansion rate of 20-100 ppm is preferable at ambient temperature for the first and second insulating substrates. The low expansion plates mentioned above are exemplified by a glass-ceramic substrate of Clearceram Z or Clearceram ZHS (Ohara Inc.), a low expansion crystallization glass TCM (Okamoto Glass Co., Ltd.), a ULE glass (Corning Inc.) and a Zerodur (Schott). The examples of the thermal expansion rate characteristics are shown in FIG. 3. As shown in the drawing, the thermal expansion rate of Clearceram Z is 4 ppm or less at 40° C., which is less than a fifth of Pyrex glass and silicon. The rate is less than a tenth at 50° C.

In the case of the pressure sensor of FIG. 1, adhesives are preferably used for adhering the low expansion plate to the first insulating substrate. It is preferable to apply the adhesive as little as possible and carry out adhesion at the temperature of environment where the pressure sensor is mounted. Thus, the temperature characteristic is further improved.

Here, the low expansion plate is preferably designed to have the same area as the first insulating substrate. Therefore, in the case where terminal pins project from the first insulating substrate surface, the plate preferably has holes which the terminal pins go through. The plate may be arranged to make way for the terminal pins. In this case, it is desirable to make the plate as large as possible.

The pressure sensor shown in FIG. 1 is fabricated in the following manner by using a silicon substrate. A first glass substrate 10 on which capacitance electrodes 11 are formed and a silicon substrate 20 in which a hollow is formed for the pressure reference room 1 are stacked, and bonded at 300-450° C. in vacuum by applying about several hundreds volts to 1000 volts. Thus, the pressure reference room 1 is formed. The silicon substrate is etched from the other side of the pressure reference room 1 to form the diaphragm 21, and then stacked on a second glass substrate 30 having a gas inlet 31. The substrates are similarly bonded according to the anodic bonding method. The terminal pins 12 and 13 are attached. Then, a low expansion substrate 40 in which the holes are formed at the positions corresponding to terminal pins is adhered with an adhesive to complete the pressure sensor.

In FIG. 1, the low expansion plate 40 is adhered on the first insulating substrate 10. It is also possible in this invention to adhere the plate on the surface (undersurface) of second insulating substrate 30, or both surfaces of the first and second insulating surface. The plate can be metal (alloy) or semiconductor instead of glass, ceramic or other insulating substrates.

Embodiment 1

In this embodiment, capacitive pressure sensors (133 Pa sensor) having the structure of FIG. 1 were fabricated to compare the temperature characteristics with a conventional pressure sensor.

Pyrex glass substrates of 11×11×0.7 mm (width×Depth× thickness) and 20×20×2 mm were used for the first glass substrate 10 and the second glass substrate 30, respectively. The silicon substrate 20 had a thickness of 0.4 mm and the same area as the first glass substrate 10. The diaphragm 21 was 4.2 mm×4.2 mm×7 μm. By the method mentioned above, three conventional pressure sensors were fabricated (Sample 1). Then, a SY-W glass plate of about 8×8×2 mm was adhered on the first glass substrate (Sample 2) and a Clearceram Z plate of 7×7×1.5 mm was adhered on the first glass substrate (Sample 3). These plates were placed with a design of making way for the terminal pins.

Here, the low expansion plate 40 and the first glass substrate 10 were treated with a surface modifier and then bonded with an adhesion. The "Aron Glass Primer" and "Aronalpha #201" of TOAGOSEI Inc. were used as the surface modifier and the adhesives, respectively. The sensors were left alone for the whole day after bonding.

The pressure sensors thus fabricated were installed to the vacuum chamber and heated or cooled to a predetermined temperature while Ar gas was introduced into the vacuum chamber to the measurement pressure range of 0-133 Pa and the electrostatic capacitance between the capacitance electrode and the diaphragm was measured. The pressure was also measured for calibration with a temperature-controlled, Baratron vacuum gauge of MKS Instruments, Inc., which was separately installed to the vacuum chamber. The measurement results are shown in FIG. 4.

Figure 4A:
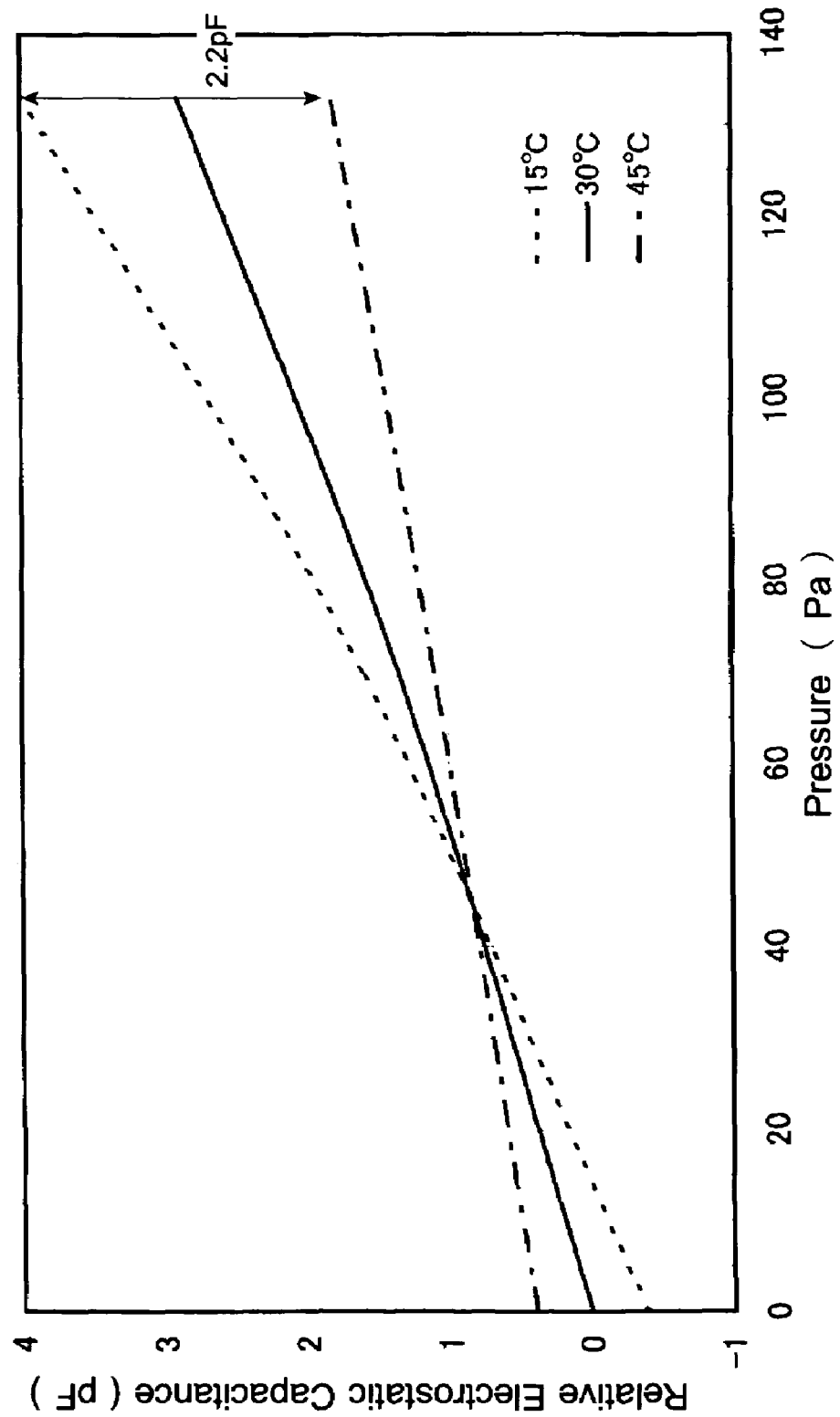
FIG. 4A is a graph showing the relationship of electrostatic capacitance vs. pressure at various temperatures for Sample 1 of 133 Pa sensor.
Figure 4C:
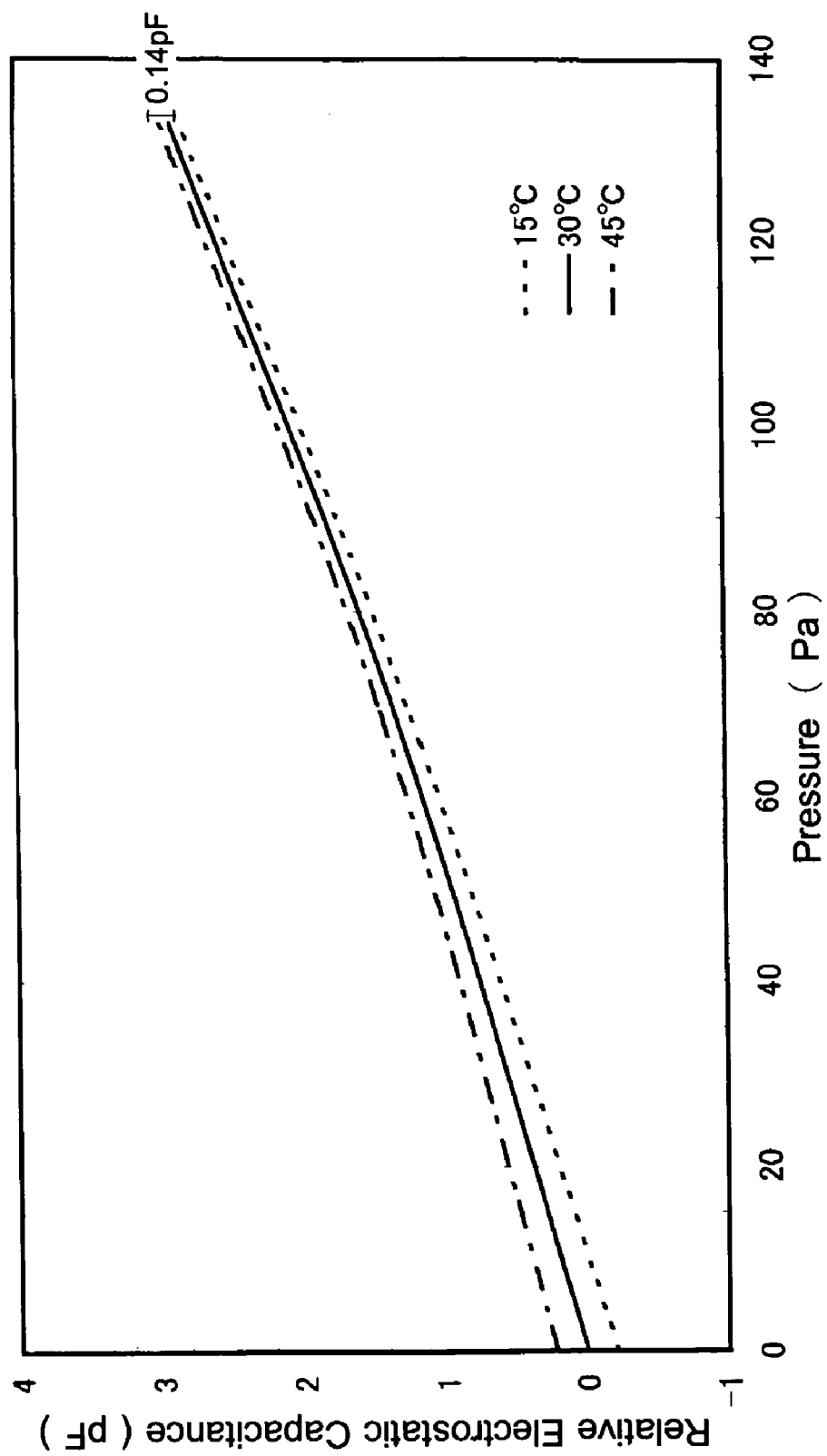
FIG. 4C is a graph showing the relationship of electrostatic capacitance vs. pressure at various temperatures for Sample 3 of 133 Pa sensor.

FIG. 4A shows the data of the conventional sensor (Sample 1) in which the low expansion plate is not adhered. FIGS. 4B and 4C show data of Sample 2 and Sample 3, in which a SY-W glass and a Clearceram Z plate are adhered on the first glass substrates, respectively. In the drawings, the relative electrostatic capacitance (in the ordinate) was obtained as follows. That is, the relative capacitance observed at 30° C. and 0 Pa was determined as 0 pF. The relative capacitance-pressure relation obtained at 30° C. was defined as a standard for each sample. Then, relative capacitance-pressure relations obtained at various temperatures were expressed in values relative to the standard.

As shown in FIG. 4A, the measured values of relative electrostatic capacitance change as the ambient temperature rises. That is, the measured value at 0 Pa increases with the temperature while the value at 133 Pa decreases. It is apparent from the comparison between FIGS. 4B and 4C that the variation of relative electrostatic capacitance is reduced when the low expansion plate is adhered on the first glass substrate, and the variation is further suppressed as the thermal expansion rate of the plate is lower. That is, the variation of electrostatic capacitance at 133 Pa is 2.2 pF for 30 degrees temperature change (Sample 1). In contrast, the variations are 1.7 pF (Sample 2) and only 0.14 pF (Sample 3).

Next, the values of 133 Pa span drift and the zero pressure drift for temperature change are obtained from the measurement data of FIG. 4 and summarized in Table 1. The span drift and the zero pressure drift for temperature change can be regarded as temperature coefficients of span and zero, and are expressed in % FS/° C. unit. Here, FS stands for full-scale and is 133 Pa span at 30° C. Therefore, the temperature coefficient of the 133 Pa span is defined as the variation of the electrostatic capacitance corresponding to the 133 Pa span per the unit temperature change by expressing in percentage to the full scale.

Furthermore, the temperature coefficient of the zero pressure is defined as the variation of electrostatic capacitance at 0 Pa per unit temperature change by expressing in percentage to full scale.

TABLE 1

|  | Temperature coefficient of zero-pressure [% FS/° C.] | Temperature coefficient of 133 Pa span [% FS/° C.] |
| --- | --- | --- |
| Sample 1 | 0.9 | −3.4 |
| Sample 2 | 0.4 | −2.4 |
| Sample 3 | 0.5 | −0.43 |

As is apparent from Table 1, by adhering the plate having a low thermal expansion rate on the first glass substrate, the temperature coefficients of zero pressure and 133 Pa span decrease, and the measurement error due to the fluctuation of ambient temperature becomes low. Furthermore, when the plate having an extremely low thermal expansion rate of 4 ppm or less is employed, the temperature coefficient of 133 Pa can be greatly decreased.

Furthermore, the sample in which two Clearceram plates were stacked and adhered was similarly fabricated to examine the temperature characteristics. It was confirmed that the temperature characteristic was further improved.

Embodiment 2

Figure 5:
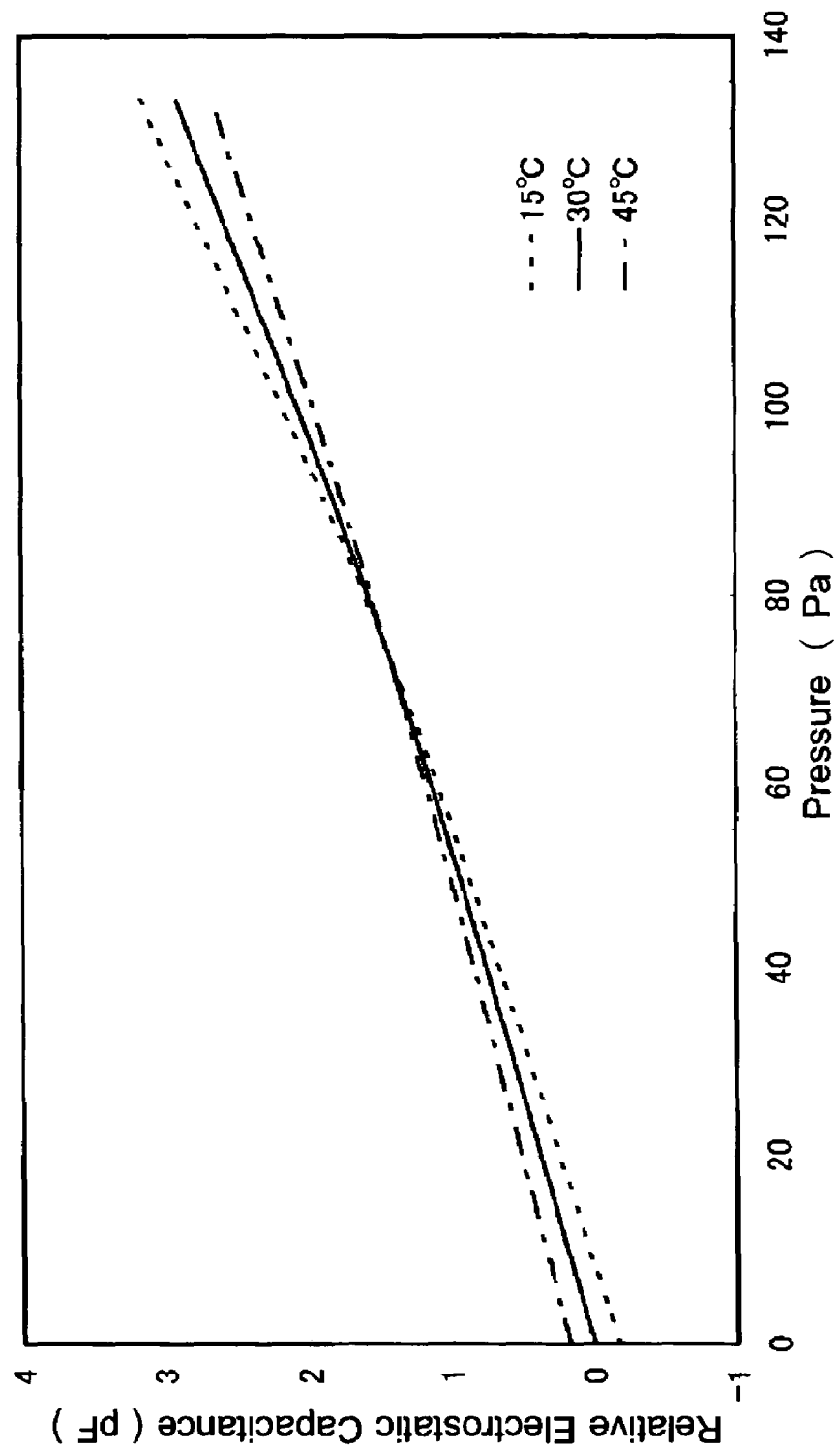
FIG. 5 is a graph showing the relationship of electrostatic capacitance vs. pressure at various temperatures for the Sample 5 of 133 Pa sensor.
Figure 6:
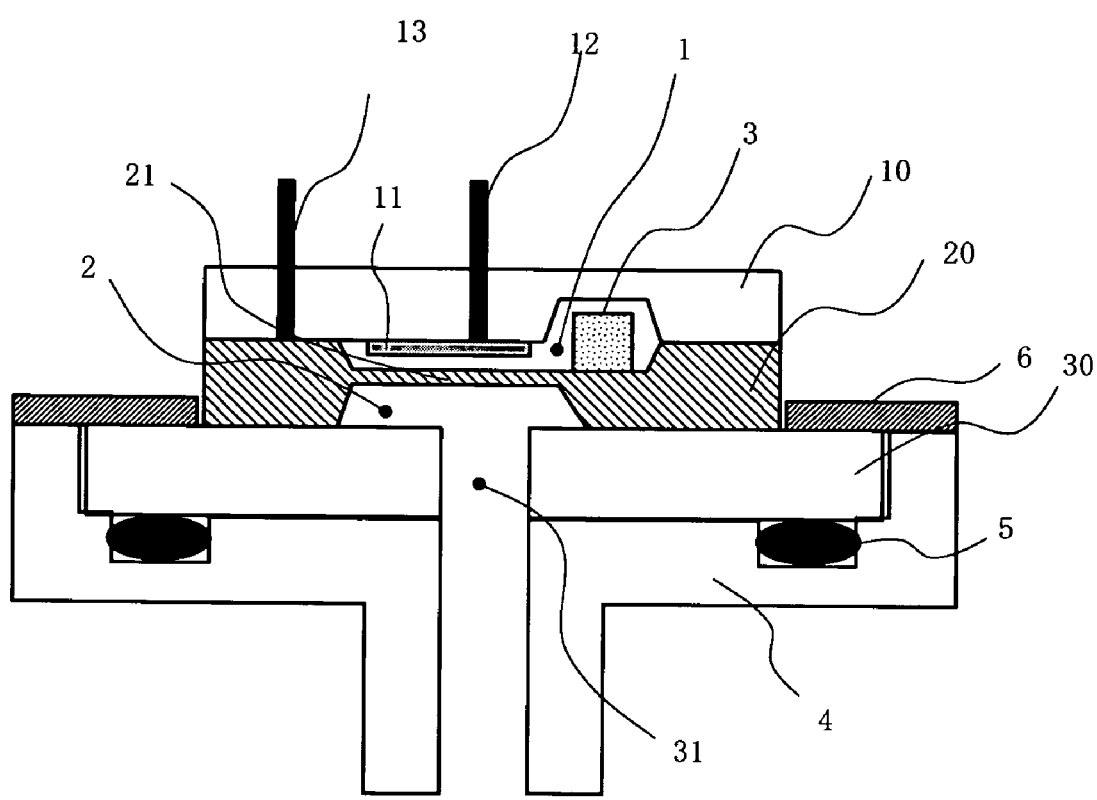
FIG. 6 is a schematic sectional view showing a conventional diaphragm type pressure sensor.

Two conventional pressure sensors were fabricated in the similar manner as Embodiment 1 (Sample 4). A low expansion plate, Clearceram Z-HS plate, was adhered on one of them (Sample 5). Then, these sensors were installed to the vacuum chamber to measure the temperature characteristics of electrostatic capacitance. The measurement results of sample 5 are shown in FIG. 5, and the temperature drifts obtained are shown in Table 2.

TABLE 2

|  | Temperature coefficient of zero-pressure [% FS/° C.] | Temperature coefficient of 133 Pa span [% FS/° C.] |
| --- | --- | --- |
| Sample 4 | 0.9 | −3.5 |
| Sample 5 | 0.4 | −0.98 |

Temperature coefficients of zero-pressure and 133 Pa span of Sample 5 were greatly decreased as compared with the conventional Sample 4.

Embodiment 3

In this embodiment, two high-sensitive 33 Pa sensor were fabricated (Sample 6). The sensor configuration was the same as Embodiment 1 except that the diaphragm had an area of 6.6×6.6 mm in this embodiment. A Clearceram Z-HS plate was adhered as a low expansion plate (sample 7).

TABLE 3

|  | Temperature coefficient of zero-pressure [% FS/° C.] | Temperature coefficient of 133 Pa span [% FS/° C.] |
| --- | --- | --- |
| Sample 6 | 1.2 | −4.2 |
| Sample 7 | 0.54 | −0.81 |

As shown in Table 3, even in the case of the high-sensitive sensor preferably used in the low pressure region, the temperature coefficients were greatly reduced by adhering a low expansion plate.

One of ordinary skill in the art will appreciate that the present invention is not limited to the disclosed embodiments or the claims set forth below, but include equivalents thereto.

The invention claimed is:

1. A diaphragm pressure sensor comprising:
a first insulating substrate, a conductive substrate with a diaphragm, and a second insulating substrate with a gas inlet that are bonded together so as to form a pressure reference room between said diaphragm and said first insulating substrate and a pressure measuring room between said diaphragm and said second insulating substrate, and the deformation of said diaphragm caused by the pressure difference between said pressure measuring room and said pressure reference room is measured to obtain the pressure of a space which is communicated with said pressure measuring room through said gas inlet, wherein a plate is adhered to at least one of said first and second insulating substrates and said plate has a lower thermal expansion rate at an ambient temperature than that of the insulating substrate to which said plate is adhered.

2. The diaphragm type pressure sensor according to claim 1, wherein said plate is adhered on said insulating substrate at a temperature near said ambient temperature.

3. The diaphragm type pressure sensor according to claim 2, wherein said conductive substrate is made of silicon, and the first insulating substrate and the second insulating substrate are made of glass.

4. The diaphragm type pressure sensor according to claim 3, wherein the thermal expansion rate of said plate at said ambient temperature is a fifth or less of the rate of the insulating substrate to which it is attached.

5. The diaphragm type pressure sensor according to claim 4, wherein the thermal expansion rates at said ambient temperature of said first and said second insulating substrate and said conductive substrate are 20-100 ppm, and the thermal expansion rate of said plate is 4 ppm or less.

6. The diaphragm type pressure sensor according to claim 3, wherein the thermal expansion rates at said ambient temperature of said first and said second insulating substrate and said conductive substrate are 20-100 ppm, and the thermal expansion rate of said plate is 4 ppm or less.

7. The diaphragm type pressure sensor according to claim 2, wherein the thermal expansion rate of said plate at said ambient temperature is a fifth or less of the rate of the insulating substrate to which it is attached.

8. The diaphragm type pressure sensor according to claim 7, wherein the thermal expansion rates at said ambient temperature of said first and said second insulating substrate and said conductive substrate are 20-100 ppm, and the thermal expansion rate of said plate is 4 ppm or less.

9. The diaphragm type pressure sensor according to claim 2, wherein the thermal expansion rates at said ambient temperature of said first and said second insulating substrate and said conductive substrate are 20-100 ppm, and the thermal expansion rate of said plate is 4 ppm or less.

10. The diaphragm type pressure sensor according to claim 1, wherein said conductive substrate is made of silicon, and the first insulating substrate and the second insulating substrate are made of glass.

11. The diaphragm type pressure sensor according to claim 10, wherein the thermal expansion rate of said plate at said ambient temperature is a fifth or less of the rate of the insulating substrate to which it is attached.

12. The diaphragm type pressure sensor according to claim 11, wherein the thermal expansion rates at said ambient temperature of said first and said second insulating substrate and said conductive substrate are 20-100 ppm, and the thermal expansion rate of said plate is 4 ppm or less.

13. The diaphragm type pressure sensor according to claim 10, wherein the thermal expansion rates at said ambient temperature of said first and said second insulating substrate and said conductive substrate are 20-100 ppm, and the thermal expansion rate of said plate is 4 ppm or less.

14. The diaphragm type pressure sensor according to claim 1, wherein the thermal expansion rate of said plate at said ambient temperature is a fifth or less of the rate of the insulating substrate to which it is attached.

15. The diaphragm type pressure sensor according to claim 14, wherein the thermal expansion rates at said ambient temperature of said first and said second insulating substrate and said conductive substrate are 20-100 ppm, and the thermal expansion rate of said plate is 4 ppm or less.

16. The diaphragm type pressure sensor according to claim 1, wherein the thermal expansion rates at said ambient temperature of said first and said second insulating substrate and said conductive substrate are 20-100 ppm, and the thermal expansion rate of said plate is 4 ppm or less.

* * * * *